United States Patent [19]

van Beijnum et al.

[11] Patent Number: 5,198,592

[45] Date of Patent: Mar. 30, 1993

[54] HYDROGENOLYSIS REACTION AND CATALYST SUITABLE THEREFOR

[75] Inventors: Johannes van Beijnum, Soest; Adrianus J. van Dillen, Culemborg; John W. Geus, Bilthoven, all of Netherlands

[73] Assignee: Engelhard De Meern B.V., De Meern, Netherlands

[21] Appl. No.: 597,093

[22] Filed: Oct. 15, 1990

Related U.S. Application Data

[63] Continuation of Ser. No. 281,194, Dec. 7, 1988, abandoned.

[30] Foreign Application Priority Data

Dec. 11, 1987 [NL] Netherlands ............... 8703002

[51] Int. Cl.$^5$ ........................................ C07C 29/136
[52] U.S. Cl. .......................... 568/885; 502/331; 549/503; 544/336; 544/358; 568/579; 568/876; 568/877; 568/878; 564/401; 564/422; 564/479; 564/480; 564/485
[58] Field of Search ............... 568/876, 877, 885, 914, 568/429, 349

[56] References Cited

U.S. PATENT DOCUMENTS

| | | | |
|---|---|---|---|
| 2,127,367 | 8/1938 | Normann et al. | 568/877 |
| 2,234,246 | 3/1941 | Goombridge | 578/713 |
| 2,569,671 | 10/1951 | Hughes et al. | 568/877 |
| 3,723,353 | 3/1973 | Eurlings et al. | 252/459 |
| 3,925,490 | 11/1975 | Reich et al. | 568/914 |
| 3,944,609 | 3/1976 | Fetchin et al. | 564/127 |
| 3,997,477 | 12/1976 | Takeuchi | 502/314 |
| 4,046,823 | 9/1977 | Gordon et al. | |
| 4,113,658 | 9/1978 | Geus | 252/454 |
| 4,144,198 | 3/1979 | Miya et al. | 568/885 |
| 4,146,503 | 3/1979 | Vogt et al. | 518/713 |
| 4,186,112 | 1/1980 | Vogt et al. | 518/713 |
| 4,657,887 | 4/1987 | Hardman et al. | 518/713 |
| 4,657,888 | 4/1987 | Mesters et al. | 518/713 |
| 4,665,042 | 5/1987 | Budge et al. | 502/61 |
| 4,748,144 | 5/1988 | Monnier et al. | 518/713 |
| 5,002,922 | 2/1991 | Irgawg | 564/480 |
| 5,004,845 | 4/1991 | Bradley et al. | 568/914 |
| 5,124,491 | 6/1992 | Fleckenstein et al. | 568/885 |

FOREIGN PATENT DOCUMENTS

| | | |
|---|---|---|
| 0100512 | 2/1984 | European Pat. Off. |
| 0320074 | 6/1989 | European Pat. Off. ............ 502/331 |
| 2554203 | 6/1976 | Fed. Rep. of Germany . |
| 1200730 | 7/1970 | United Kingdom ............... 568/877 |
| 2045106 | 10/1980 | United Kingdom . |

OTHER PUBLICATIONS

Ikeda et al. Chem. Abstr vol. 69 entry 60196c (1968).
Weinnacker-Weingaertner, "Chemische Technologie", vol. Organiscehe Technologie I, pp. 780–804, Carl Hanser Verlag, Munchen, 1952.
The English translation of the above-cited article, from bottom of p. 785 to bottom of p. 786, is also included.

*Primary Examiner*—Donald G. Daus
*Attorney, Agent, or Firm*—Weingarten, Schurgin, Gagnebin & Hayes

[57] ABSTRACT

The invention concerns a method of performing a chemical reaction in which hydrogenation and/or dehydrogenation occurs, in the presence of a supported catalyst comprising a carrier material with copper as active component and iron as a promotor. According to the invention, the proporation of iron, calculated on the amount of copper and iron jointly, on an atomic basis, is no more than 25%. The invention also relates to a catalyst for carrying out the reaction, and to a process for preparing a supported catalyst.

8 Claims, 2 Drawing Sheets

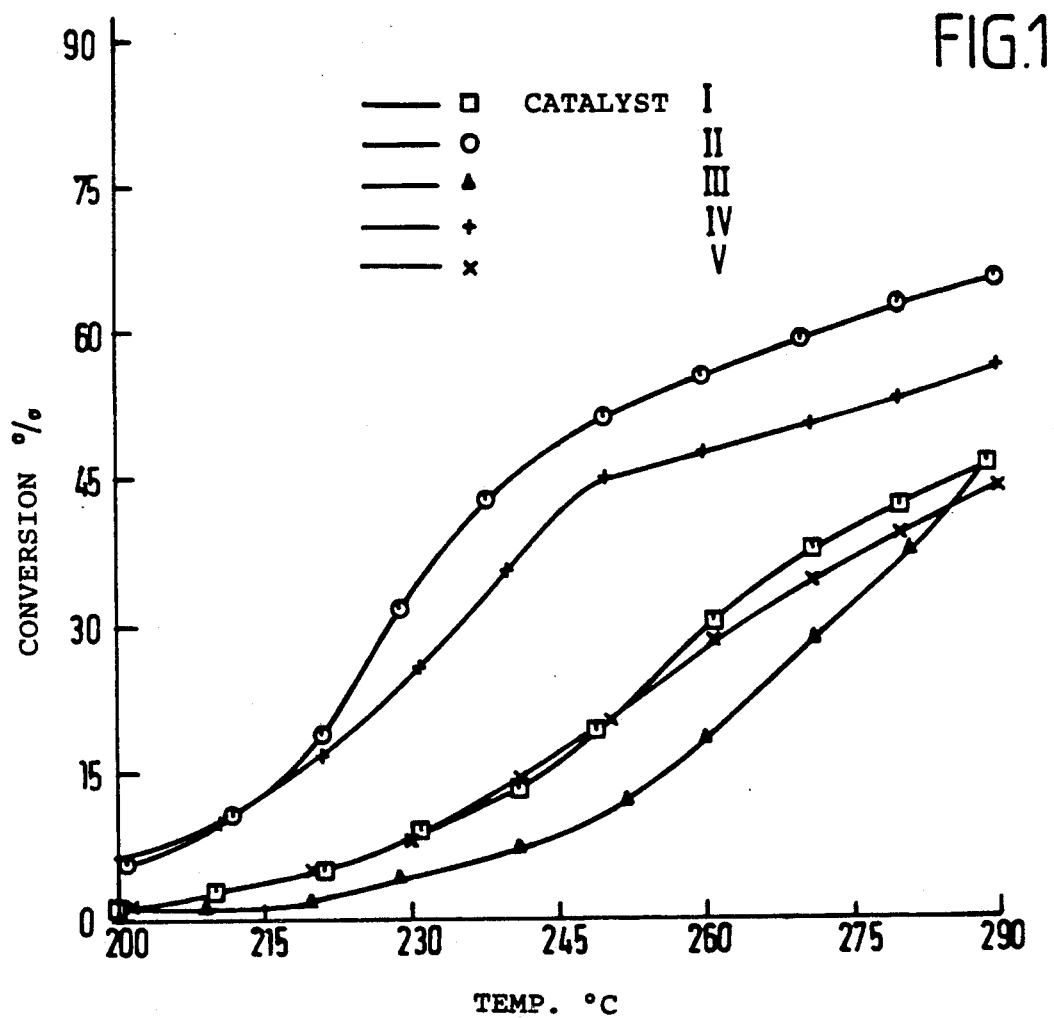

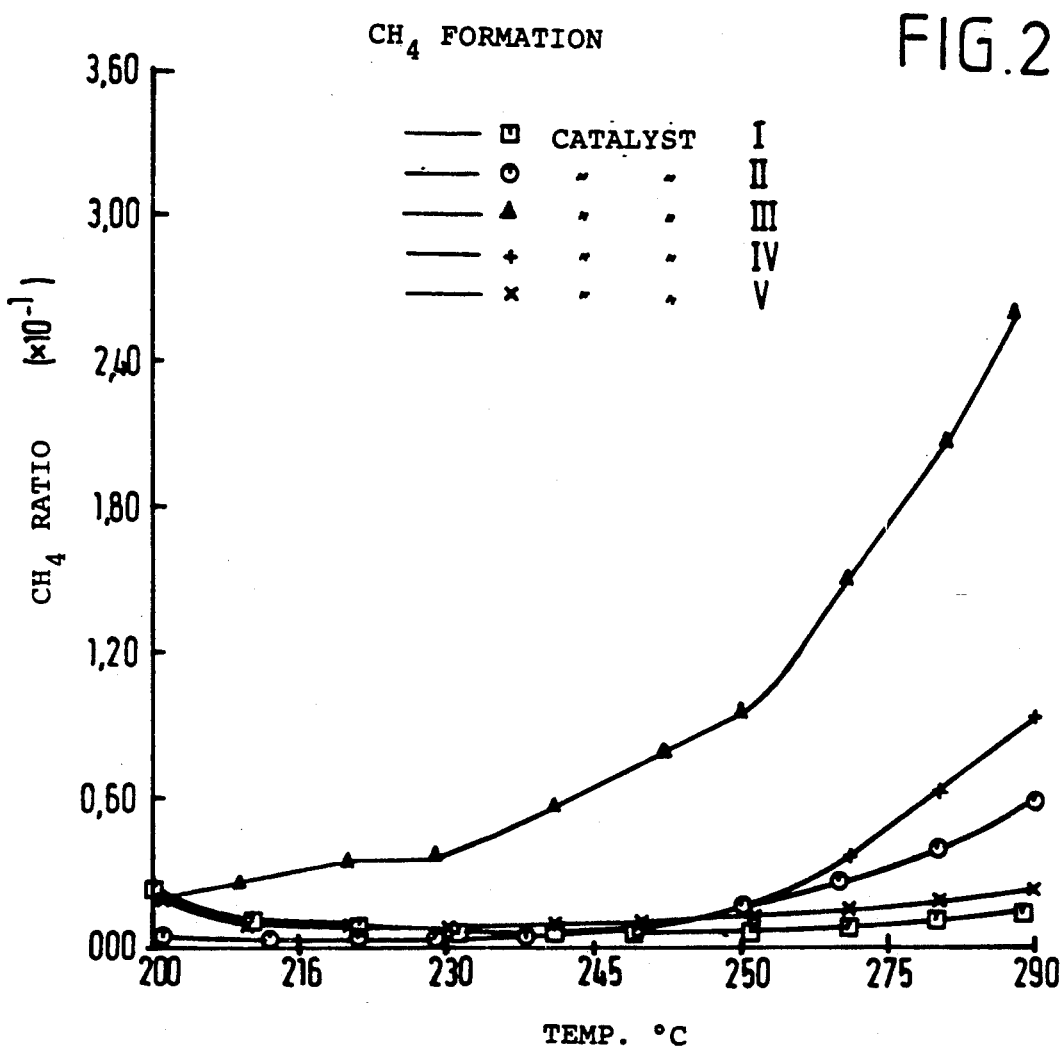

HYDROGENOLYSIS REACTION AND CATALYST SUITABLE THEREFOR

This application is a continuation of application Ser. No. 07/281,194, filed Dec. 7, 1988, now abandoned.

This invention relates to a method of carrying out a chemical reaction during which hydrogenation and/or dehydrogenation occurs, in the presence of a supported copper catalyst.

The invention also relates to a catalyst suitable for use in such a method.

The invention further relates to a process for preparing a catalyst.

Catalysts are often used in chemical processes. Their object is, on the one hand, accelerating the establishment of the thermodynamic equilibrium, and on the other hand to ensure the desired selectivity. In the latter case, the object is the preferential formation of a given one of the possible reaction products.

In some cases, the catalytically active component is used as such, but mostly the catalytically active component (or catalytically active components) is (are) applied to a so-called carrier. A highly-porous thermostable carrier prevents sintering of the catalytically active component(s) during a thermal pre-treatment of the catalyst or during use. Generally speaking, it is not desirable for the surface of the carrier proper to exhibit a given catalytic activity. There are cases, however, in which the activity of the carrier itself is also essential (bifunctional catalysts).

Copper catalysts are of great significance in hydrogenation and dehydrogenation reactions. Generally speaking, the selectivity of copper catalysts is the decisive factor for choosing them.

However, a disadvantage of these catalysts is that rather extreme reaction conditions are to be maintained to achieve a reasonable activity.

Many other metals, such as nickel, platinum, and palladium, exhibit an excellent activity for hydrogenation and dehydrogenation. In general, however, these catalysts have a poor selectivity. This means that during the (de)hydrogenation of functional groups in organic compounds, in addition to the functional group or groups, carbon-to carbon bonds of the starting product react. This applies, for example, to the hydrogenation of double or triple carbon-to-carbon bonds or aromatic carbon-to-carbon bonds. It is also possible that the carbon backbone of the starting compound is affected, whereby mostly methane is formed. In many, technically important cases, a reaction of the functional groups only is desired, and no other reactions are contemplated.

Examples of the reactions referred to are the hydrogenation of aldehydes to the corresponding alcohols. Thus saturated aldehydes can easily be produced via the oxoreaction or hydroformylation reaction by reacting olefins with carbon monoxide and hydrogen. Hydrogenation in the presence of copper catalysts makes it possible for aldehydes to be hydrogenated to form the corresponding alcohols, while when more active catalysts are used mainly saturated compounds, paraffins, are formed. In this manner, not only can short, unbranched alcohols be produced from aldehydes, but also long-chain unbranched alcohols (C12–C15), or branched alcohols, such as 2-ethylhexanol. In addition it is often possible for unsaturated aldehydes to be hydrogenated to form the corresponding alcohols without saturation of the double carbon-to-carbon bond or bonds. An example is the hydrogenation of furfural to furfuryl alcohol. Aromatic ketones can also be selectively hydrogenated to aromatic alcohols in the presence of copper catalysts, such as acetophenone to methyl phenyl carbinol. Aromatic carbon-to-carbon bonds are generally not hydrogenated when copper catalysts are used.

Another interesting reaction is the selective hydrogenation of organic nitrogen compounds. One example is the hydrogenation of aromatic nitrocompounds to form the corresponding aromatic amines. The selective hydrogenation of nitriles to amine can also be carried out by means of copper catalysts.

Of great importance is the hydrogenation of esters to the alcohols corresponding to the two components of the esters. This reaction is sometimes designated by the term "hydrogenolysis". In this way, fatty alcohols can be prepared from fatty acids after esterification with, for example, methanol. Methanol is formed back during the selective reduction in the presence of copper catalysts. Triglycerides containing fatty acid components with more than two unsaturated C—C bonds, such as linolenic acid, can be selectively hydrogenated with copper catalysts without hydrogenation of components containing two unsaturated carbon-to-carbon bonds, such as linoleic acid.

In addition to the hydrogenation reactions discussed above, dehydrogenations can also be excellently performed in the presence of copper catalysts. With a view to the thermodynamic equilibrium, a low hydrogen pressure and a raised temperature are used in these cases. The fact that copper catalysts do not promote side reactions is of great value in dehydrogenation reactions. Examples of dehydrogenation reactions are the production of acetaldehyde from ethyl alcohol and that of cyclohexanone from cyclohexanol. Another important example is the formation of pyrazine by dehydrogenation of piperazine.

Further examples which may be mentioned are the formation of secondary and tertiary amines, more generally the formation of amines, by the reaction of alcohols with primary or secondary amines.

In the literature (for example, A. Baiker et al., Catal. Rev. Sci. Eng. 27 (4) pp. 653 ff. (1985)) this reaction is designated as "dehydroamination".

Another reaction which is catalyzed by copper is the alkylation of phenols with alcohols.

In the brochure, "Copper Chromite Catalysts" of Engelhard De Meern B.V., a survey is given of reactions which can be carried out by means of a copper catalyst.

Copper compounds can be reduced to metallic copper relatively readily. One disadvantage is that metallic copper is very quickly sintered to a material having a negligible surface area and hence an extremely poor catalytic activity. An important point in this connection is that the reduction of, for example, copper oxide with hydrogen is highly exothermic. As a consequence, unless special precautionary measures are taken, the temperature will increase greatly during the reduction of copper compounds. As sintering increases greatly at higher temperatures, this is disadvantageous.

The application of copper to a carrier is therefore inevitable for nearly all catalytic uses. However, the application of a suitable copper precursor to a, mostly highly-porous, carrier in a uniform and finely divided manner is very difficult. Most copper (II) compounds are precipitated in a broad range of pH values to form relatively large crystallites of, for example, a size of 1 μm. Upon a thermal treatment, these coarse crystallites can break down into smaller crytallites, but the resulting crystallites are in contact with each other and not properly distributed over the carrier. Indeed, upon reduction, sintering quickly occurs, as a result of which the copper area is reduced and the catalytic activity deteriorates. Mostly, therefore, copper catalysts are reduced incompletely. This, however, is often unattractive, because the copper ions still present can be dissolved in the reaction product and can be removed from it with difficulty only. In particular for products intended for human consumption, such as margarine, this is most undesirable. The presence of copper ions promotes the oxidation of margarine components to products having a rancid taste, while in addition copper may be toxic. A last difficulty with copper is that the metal adheres poorly to the conventional carriers. As a result, copper particles applied to carriers will become sintered relatively rapidly at higher temperatures.

The problems with copper catalysts have long since been recognized. For this reason, special carriers are used. Zinc oxide is a carrier to which metallic copper adheres relatively well. Copper catalysts for modern methanol processes therefore consists essentiallly of copper particles applied to zinc oxide. This also applies to the low-temperature carbon monoxide shift catalyst. In spite of the good adherence of the copper particles to the zinc oxide, however, the thermal stability of the copper on zinc oxide catalyst is poor. Adkins and colaborators found in the 'thirties that a catalyst on the basis of coprecipitated copper oxide and chromium oxide had a relatively good activity and selectivity in hydrogenation reactions. They also found that the addition of barium, magnesium or calcium compounds increased the stability of the catalyst.

This Adkins catalyst, consisting of copper and/or copper oxide with chromium oxide, has suitable properties and is still being successfully used for many catalytic reactions. However, there are two drawbacks involved in the use of this catalyst: the pore structure of the copper/chromium oxide catalyst prepared by coprecipitation is less easy to control, and the use of chromium requires special measures to prevent environmental pollution. Deposition precipitation has rendered it possible to prepare copper catalysts with an excellent activity and stability. By precipitation from a homogeneous solution, a precursor of copper is homogeneously and uniformly distributed over the surface of a suitable carrier. The thermal stability is now so high that reduction at elevated temperature is now possible without any objections. The stability and activity of copper supported copper catalysts prepared by deposition precipitation are good, but yet the activity in hydrogenation reaction remains relatively low. This is possibly caused by the fact that the dissociative adsorption of hydrogen to copper has a high activation energy. As a result, hydrogen is only dissociatively adsorbed to copper at higher temperatures. At a higher temperature, however, the adsorption equilibrium is at an unfavourable point, as a result of which sometimes high to very high hydrogen pressures are required to ensure a technically feasible hydrogenation rate. Naturally, conducting processes at such hydrogen pressures leads to high investments and cost of energy.

This problem, too, has been appreciated earlier. Thus it has been proposed to add nickel to copper to increase the activity of copper catalysts. To detract from the selectivity as little as possible, the nickel has to be distributed fully homogeneously over the carrier-supported copper particles.

For example, U.S. Pat. No. 3,723,353 describes a catalyst on the basis of copper and nickel. Such nickel-promoted copper catalysts, however, are often considerably less selective than the catalysts based on pure copper, while there is also a considerable increase of dealkylation. This is particularly the case at high temperatures.

British patent publication No. 2,045,106-A describes a process for preparing a copper-iron-aluminum catalyst, comprising applying specific pH conditions. According to this specification, a catalyst thus obtained, which contains at least 28 at. % of iron, is suitable for carrying out hydrogenation reactions.

According to this publication it is essential that use is made of a solution of an Fe(II) salt. This is a technically unattractive method, due to the problems of handling Fe(II). In view of the fact that Fe(II) is rapidly oxidized to Fe(III) when exposed to air, extensive precautions have to be taken to prevent this.

It is an object of the present invention to provide a process for hydrogenation and/or dehydrogenation using a promoted copper catalyst exhibiting a particularly good selectivity, exhibiting a good acitivity, and not giving rise to excessive cracking, in particular the formation of methane. The invention is based upon the insight that iron in a limited quantity is a suitable promotor for a copper catalyst without involving the disadvantages of the nickel promotors.

The invention accordingly relates to a method of carrying out a chemical reaction in which hydrogenation and/or dehydrogenation occurs, in the presence of a supported catalyst comprising a carrier material with copper as active component and iron as a promotor, the proportion of iron, calculated on the amount of copper and iron together, on an atomic basis, being no more than 25%.

Catalysts comprising iron and copper on a carrier have been known for some time for the cracking of hydrocarbons (U.S. Pat. No. 3,997,477) and for the Fischer-Tropsch reaction (EP-A-147,839). These reactions are in principle catalyzed by iron, and the catalysts described in these publications should accordingly be regarded as copper-modified iron catalysts. This is manifest from page 2 of EP-A-147,839, where it is indicated that iron is the active component. Iron catalysts are known to be unsuitable for the reactions of the present invention. According to the present invention, copper is the active component and iron functions as the promotor.

In this connection it is further observed that it is known from U.S. Pat. No. 3,944,609 to use copper catalysts for the preparation of amide from nitrile. The catalyst described in it for the relevant hydration reaction contains no more than about 5% of iron, calculated on copper and iron. Hydration reactions are not comprised by the formulation of the type of reactions according to the present invention.

It would be expected that the catalyst used according to the present invention could be compared to the known Cu—Ni catalysts, which exhibit a high degree of cracking. Surprisingly it has now turned out that the catalysts used according to the present invention cannot be compared with copper-nickel catalysts at all, because the catalyst to be used according to the invention is highly active and very selective, whereas the copper-nickel catalyst has exactly a very low selectivity.

The catalyst to be used in accordance with the present invention may contain very different proportions of iron. The maximum proportion of iron is 25 at. % relative to the amount of copper+iron. More particularly, this proportion is between 6 and 25 at. %

Specifically, the proportion of iron, on an atomic basis, calculated on the amount of copper+iron is 10–20%.

The proportion of iron to be used is partly determined by the degree in which the iron is taken up by the carrier. The action of iron is not completely clear, but seemingly it is performed in the vicinity of the catalytically active copper component. In case a carrier is used which takes up iron in a high degree, it may be necessary to apply relatively much iron to the catalyst to compensate for the removal of the iron from the active places. This may take place especially when chromium oxide is used in the catalyst. In the presence of iron or one or more iron compound and chromium oxide(s), thermostable iron-chromium oxides may be formed, which have no appreciable promoting effect on the copper. With other carrier materials, too, the problem may present itself that non-active or less active compositions are formed between the carrier material and one or more of the other catalyst components. Strictly speaking, in calculating the ratio of copper to iron, the material which has formed such a composition should be left out of account.

Conversely, of course, when a carrier material is used which does not remove iron, a relatively small amount of iron will be sufficient.

The iron need not cover the carrier in a continuous layer, as in U.S. Pat. No. 3,997,477. In practice this is even not preferred, and in many cases the amount of iron present in the catalyst will be considerably smaller than the amount required to realize a monolayer coating of the carrier.

If desired the catalyst may contain one or more other co-promotors. In fact, it has surprisingly been found that metals such as cobalt and nickel, either each by themselves or jointly, have a positive effect on the supported Cu—Fe catalyst.

The carrier material used can be selected from the known carrier materials. The catalyst does have the advantage that it is not necessary to use chromium as a component, which is less desirable from an environmental viewpoint. Suitable carriers for the catalyst according to the present invention include $SiO_2$, $Al_2O_3$, $TiO_2$, MgO and ZnO, although chromium oxide is applicable. More in general it can be stated that one or more metal oxides are used as the carrier material. More suitable carrier materials are $Al_2O_3$ and $SiO_2$. More specifically $SiO_2$ is used as the carrier material.

In this connection it is noted that it is not necessary for the metal oxides used as the carrier to be inert with regard to the reaction to be catalyzed. It is possible that the carriers exhibit a certain catalytic effect or that these reinforce or modify the catalytic activity of the copper and iron.

The ratio of the quantity of carrier to the quantity of catalytically active metal can vary within a wide range. Generally speaking, it can be stated that the amount of carrier constitutes 15–99% by weight of the total catalyst, and the quantity of copper and iron together 1–85% by weight, but even outside these limits, a suitable catalyst can be made, depending upon the nature of the reaction. A preferred range for the amount of copper and iron present in the catalyst is between 10 and 40% by weight.

A preferred catalyst composition can be defined, therefore, as a material consisting of 60–90% by weight of silica, 2–8% by weight of iron, and balance copper.

In this connection it is noted that all percentages of copper and iron relate to the metal.

The components present on the catalyst may be present in various valencies. Copper may occur in the active catalyst in the zero-valent form, which means it is present as metallic copper or in an alloy, but alternatively it may be present in full or in part in the mono- and/or bivalent form. In this connection it is further noted that the mechanism of the catalyst action is not completely clear.

The copper present in mono- and/or bivalent form may be in the form of oxides ($Cu_2O$ or $CuO$) or of other compounds.

In the catalyst to be used according to this invention, the iron may have various valencies, namely zero, two or three and all three possibilities may exist next to each other.

Surprisingly it has been found that a particularly good activity and selectivity are obtained if the iron component is present partly as zero-valent iron and partly as bi- and/or trivalent iron.

The invention accordingly also comprises a catalyst suitable for carrying out chemical reactions, comprising a carrier material with copper applied thereto and iron as a promotor, the proportion of iron, calculated on the quantity of copper and iron together, on an atomic basis, ranging between 6 and 25 at. %.

In the active catalyst, iron is preferably present in the zero-valent form. This can be realized by reducing the catalyst under suitable conditions. The iron ions, like the copper ions, may be present as in oxide or in another compound.

The ratio of Fe(0) to Fe(II) and/or Fe(III) together may vary within wide ranges, for example, from 1–99 to 99–1. More particularly the amount of Fe(0) is at least 10%, and more specifically at least 20% of the total amount of iron.

Generally speaking, the iron(0) will at least partly be present in a copper(0)-rich phase, for example, as a copper-iron alloy. It is assumed that iron(0) which is not in direct contact with copper(0), i.e., which is present as a discrete metallic iron phase, has no or no substantial promoting effect.

The preferred embodiments discussed within the framework of the process are also applicable to the catalyst according to the invention.

The catalyst to be used in the process according to the invention can be made in various known manners. Accordingly, this also applies to the catalyst according to the invention. In this connection the various deposition-precipitation methods are preferred. These can be effected, for example, by suspending the carrier material in an aqueous solution of water-soluble salts of copper and the promotor, in the desired ratio, followed by precipitating the metal compounds from the suspension. It is also possible for the catalyst to be made by impregnating the carrier material or by adsorption to the carrier material.

Depending on the desired use, the supported catalyst can be further reduced, thermally treated or otherwise adapted. Precipitation from solution can be effected by adaptation of the pH, for example, by supplying an acid or a base, urea decomposition, or by electrochemical means. A survey of various methods is given in a publication by A. J. van Dillen, J. W. Geus, L. A. M. Hermans and J. van der Meijden in Proceedings 6th International Conference on Catalysis, London (1976) and in L. A. M. Hermans and J. W. Geus in Preparation of Catalyst II (B. Delmon, P. Grange, P. Jacobs and G. Poncelet, editors) pp. 113-130, Elsevier, Amsterdam, 1979.

A description of the deposition precipitation is also given in U.S. Pat. No. 4,113,658. Deposition-precipitation is also discussed in European patent applications 71,983 and 100,512.

It is noted that the various components of the catalyst may be applied successively or, in full or in part, simultaneously.

One possibility, for example, is the simultaneous deposition-precipitation of copper and iron compounds on a ready carrier. It is also possible, however, to apply iron to a supported copper catalyst already formed, for example, a commercial copper-chromite catalyst.

Other methods of making catalysts, such as coprecipitation, in which the carrier is precipitated along with at least one of the other components, are also applicable.

Although these methods provide a suitable catalyst, in many cases they require the use of a solution of an Fe(II) salt, which had the disadvantages discussed earlier.

The invention also relates to a process for producing a supported catalyst comprising copper and iron. According to this process, the catalyst is prepared by introducing $Fe^{3+}$ ions, either by injection or by electrochemical generation, optionally simultaneously with $Cu^{2+}$ ions, and, or a solution of a precursor of the carrier material into a stirred solution or suspension of which the pH value is kept at a value between 4 and 7 with the proviso that if an $Fe^{3+}$ solution is injected into a suspension of a carrier already containing copper, the pH is kept at a value of at most 5.9.

It has surprisingly been found that this process produces a catalyst having a very good activity and selectivity. Preferably, the proportion of iron in the catalyst is no more than 25% on an atomic basis, calculated on the overall quantity of iron and copper. The minimum quantity may be extremely low, but is preferably not less than 6%, calculated on the same basis. The preferred amount of iron is between 10 and 20%.

In this preparation of the catalyst, the starting product may be either a carrier already formed, which is suspended in an aqueous solution, and on which the iron is precipitated, or a system in which iron, copper and the carrier are precipitated simultaneously by injecting, among other materials, a solution of trivalent iron ions.

According to a preferred embodiment of the present invention an aqueous solution of trivalent iron ions is injected under the surface of a vigorously stirred suspension of the carrier material which optionally already contains copper.

The catalyst may be in the form of fine particles as well as in the form of mouldings, such as rings, pellets, extrudates and the like. The shape which the catalyst is given depends essentially on the contemplated application, such as the nature of the reaction and the medium in which it is carried out.

The reactions according to this invention in which the catalyst is applicable are generally those in which the known copper catalysts are used. These may, for example, be liquid-phase and/or gas-phase reactions. Examples of reactions are those mentioned in the discussion of the state of the art and specifically the hydrogenation of aldehydes, amides, fatty acids, fats and oils, nitriles, nitroaromatic hydrocarbons, ketones, and furfural, but also the hydrogenolysis of esters, the alkylation of alcohols with amines or of phenol with alcohols, the amination of alcohols, the dehydrogenation of alcohols, and the like.

These reactions are included by the definition that the reaction should comprise hydrogenation and/or dehydrogenation. This means that the net result of the reaction may be hydrogenation or dehydrogenation, but it is also possible that hydrogenation or dehydrogenation is only one of the steps in the reaction mechanism. In certain cases, such as in the above dehydroamination of alcohols, it is also possible that the net hydrogen consumption or the net hydrogen production is nil, because the reaction mechanism comprises both hydrogenation and dehydrogenation.

Naturally, the definition does not include the cracking of hydrocarbons, the methane steam reformation, a shift reaction or the decomposition of ammonia.

The present invention is illustrated in and by the following examples.

PREPARATION I

Comparative 25.00 g Aerosil 380, marketed by Degussa, was suspended in 2 l deionized water of 21° C. To this suspension, 40.74 g $Cu(NO_3)_2 \cdot 3H_2O$ and 50.75 g urea were added. The pH of this suspension was adjusted to 3.0 by means of concentrated $HNO_3$. With vigorous stirring the temperature of the suspension was brought to 90° C. After 20 hours, the suspension was filtered and washed with 800 ml deionized water. The material was dried in air for 16 hours at a temperature of 120° C. After pressing at a pressure of 150 MPa, a sieve fraction of 0.5–0.85 mm was made. By treating this sieve fraction for 16 hours in a gas-stream of 25 ml/min, consisting of 20% $H_2$ in $N_2$ at a temperature of 300° C., catalyst I was obtained.

PREPARATION II 25.00 g Aerosil 380, marketed by Degussa, was suspended in 2 l deionized water of 21° C. To this suspension, 34.63 g $Cu(NO_3)_2 \cdot 3H_2O$ and 43.27 g urea were added. The pH of this suspension was adjusted to 3.0 by means of concentrated $HNO_3$. With vigorous stirring the temperature of the suspension was brought to 90° C. After 20 hours the suspension was filtered. The material so obtained was subsequently dispersed in 1.50 l deionized water with a temperature of 40° C. The pH of this suspension was adjusted to 5.6 by means of concentrated $HNO_3$. 11.63 g $Fe(NO_3)_3 \cdot 9H_2O$ was dissolved in 200 ml deionized water. The pH of this solution was adjusted to 1.0 by means of concentrated $HNO_3$. This solution was injected into the suspension at a constant rate over a period of 5 hours. During this injection, the pH of the suspension was kept between 5.53 and 5.63 by means of injecting a 0.75 M NaOH solution. Subsequently, the suspension was filtered and washed with 800 ml deionized water. The material was dried in air for 16 hours at a temperature of 120° C. After pressing at a pressure of 150 MPa, a sieve fraction of 0.5–0.85 mm was made. By treating this sieve fraction for 16 hours in a gas stream of 25 ml/min, consisting of 20%

$H_2$ in $N_2$, at a temperature of 300° C., catalyst II was obtained.

PREPARATION III

Comparative 25.00 g Aerosil 380 V, marketed by Degussa, was suspended in 2 l deionized water of 21° C. To this suspension, 40.52 g $Cu(NO_3)_2 \cdot 3H_2O$, 0.265 g $Ni(NO_3)_2 \cdot 6H_2O$ and 50.75 g urea were added. The pH of this suspension was adjusted to 3.0 by means of concentrated $HNO_3$. With vigorous stirring, the temperature of the suspension was brought to 90° C. After 20 hours, the suspension was filtered and washed with 800 ml deionized water. The material was dried in air for 16 hours at a temperature of 120° C. After pressing at a pressure of 150 MPa, a sieve fraction of 0.5–0.85 mm was made. By treating this sieve fraction for 16 hours in a gas-stream of 25 ml/min, consisting of 20% $H_2$ in $N_2$, at a temperature of 300° C., catalyst III was obtained.

PREPARATION IV 10.0 g commercial copper chromite catalyst was dispersed in 1.50 l deionized water with a temperature of 40° C. The pH of this suspension was adjusted to 5.9 with concentrated $HNO_3$. 10.0 g $Fe(NO_3)_3 \cdot 9H_2O$ was dissolved in 80 ml deionized water. The pH of the solution was adjusted to 1.0 with concentrated $HNO_3$. This solution was injected into the suspension at a constant rate over a period of 3 hours and 20 minutes. During the injection, the pH of the suspension was maintained between 5.85 and 5.95 by injecting a 0.75 M NaOH solution. Subsequently the suspension was filtered and washed with 1 l deionized water. The material was dried in air for 16 hours at a temperature of 120° C. After tabletting at a pressure of 150 MPa, a sieve fraction of 0.5–0.85 mm was made. By treating this sieve fraction for 16 hours in a gas-stream of 25 ml/min, consisting of 20% $H_2$ in $N_2$, at a temperature of 200° C., catalyst IV was obtained.

PREPARATION V

Comparative

The commercial copper chromite catalyst as used in Example IV was tabletted at a pressure of 150 MPa. From these pellets, a sieve fraction of 0.5–0.85 mm was made. By treating this sieve fraction for 16 hours in a gas-stream of 25 ml/min, consisting of 20% $H_2$ in $N_2$, at a temperature of 300° C., catalyst V was obtained.

EXAMPLES I-V

Activity and selectivity measurement of catalysts I-V

To determine the activity of the catalysts, the hydrogenolysis of methyl acetate was used:

$$CH_3COOCH_3 + 2H_2 \rightarrow CH_3OH + CH_3CH_2OH$$

The ethanol formed in this reaction can react with methyl acetate via a transesterfication reaction:

$$CH_3COOCH_3 + CH_3CH_2OH \rightarrow CH_3COOCH_2CH_3 + CH_3OH$$

The ethyl acetate formed during this reaction can be converted into ethanol by a hydrogenolysis:

$$CH_3COOCH_2CH_3 + 2H_2 \rightarrow 2CH_3CH_2OH$$

These reactions were carried out by passing a gas-stream of 45 ml/min of $H_2$ with 8% by volume of methyl acetate through a reactor containing 0.5 g catalyst. The activity of the catalysts was measured in the temperature range of 200° to 290° C. The measurements were taken with increasing temperature. The conversion is calculated as follows:

$$\text{conversion } (\%) = (1 - c_2/c_1) \times 100\%$$

where $c_1$ is the methyl acetate partial pressure upstream of the reactor and $c_2$ the methyl acetate partial pressure downstream of the reactor.

The selectivity for methanol is calculated as follows:

$$\text{selectivity for methanol } (\%) = (c_3/(c_1 - c_2)) \times 100\%$$

where $c_1$ is the methyl acetate partial pressure upstream of the reactor and $c_2$ the methyl acetate partial pressure downstream of the reactor, and $c_3$ the methanol partial pressure downstream of the reactor. The calculation of the selectivity for ethanol is similar to the calculation for methanol. Because the ethyl acetate formed in the reaction can react with $H_2$ to form the desired reaction product, ethanol, the selectivity for ethanol + ethyl acetate is also mentioned in the results of the experiments. The selectivity for ethanol + ethyl acetate is calculated as follows:

$$\text{selectivity for ethanol + ethyl acetate}$$
$$(\%) = ((c_4 + 2c_5)/(c_1 - c_2)) \times 100\%.$$

In this equation, $c_1$ is the methyl acetate partial pressure upstream of the reactor, $c_2$ is the methyl acetate partial pressure downstream of the reactor, $c_4$ the ethanol partial pressure downstream of the reactor, and $c_5$ the ethyl acetate partial pressure downstream of the reactor.

The methane ratio is calculated as follows:

$$\text{methane ratio} = (c_6/(c_1 - c_2))$$

In this equation, $c_1$ is the methyl acetate partial pressure upstream of the reactor, $c_2$ is the methyl acetate partial pressure downstream of the reactor, and $c_6$ is the methane partial pressure downstream of the reactor.

The results of these experiments are shown graphically in the accompanying FIGS. 1 and 2, while the conversion and selectivity of the catalysts are specified in Table 1 below at a reaction temperature of 250° C.

FIG. 1 clearly shows that the iron-promoted catalysts II and IV have a greatly increased activity relative to the non-promoted catalysts I and V. The nickel-promoted catalyst III is less active than the non-promoted catalysts I and V.

FIG. 2 clearly shows that the nickel-promoted catalyst III produces much more methane than do the other catalysts. These two Figures show, therefore, that the promotion of copper catalysts with iron results in a marked increase in activity, without this having any substantial effect on the selectivity. Nickel-promoted catalysts, on the other hand, give no improvement in activity, but do show a great undesirable increase in the formation of methane.

TABLE 1

Activity and selectivity at 250° C.

| catalyst | conversion (%) | selectivity (%) methanol | ethanol | ethanol + ethyl acetate | methane ratio |
|---|---|---|---|---|---|
| I* | 19.2 | 100 | 30 | 94 | 0.006 |
| II | 51.3 | 100 | 41 | 92 | 0.010 |
| III* | 12.0 | 73 | 31 | 76 | 0.080 |
| IV | 44.8 | 96 | 38 | 90 | 0.008 |
| V* | 20.3 | 100 | 29 | 95 | 0.011 |

*not in accordance with the invention

PREPARATION VI

Comparative

Catalyst VI was prepared in a similar procedure as used in preparation example I. As a support 25.03 g of Aerosil OX50 was applied. The amounts of Cu(NO$_3$)$_2$·3H$_2$O and urea were 10.54 g and 7.85 g, respectively.

PREPARATION VII

Catalyst VII was prepared in a similar procedure as used in preparation example II. As a support 25.00 g of Aerosil OX50 was applied. The amounts of Cu(NO$_3$)$_2$·3H$_2$O, Fe(NO$_3$)$_3$·9H$_2$O and urea were 8.97 g, 3.03 g and 6.69 g, respectively.

EXAMPLE VI

Catalysts I, II and VI, VII were tested on their performance in the hydrogenolysis of coconut methyl ester. In each test a sieve fraction of 100 mesh of the catalyst was suspended in the feed to a total catalyst loading of 1.8 wt%. The slurry was agitated at 1800 rpm. The reaction was conducted at a temperature of 280° C. and a hydrogen pressure of 204 bar. The conversion of coconut methyl ester was monitored by sampling the liquid at fixed intervals, followed by the determination of the amount of KOH required for the saponification of unconverted methyl ester. The results are indicated in Table 2.

Table 2 clearly illustrates the beneficial effect of iron on the activity of supported copper catalysts.

TABLE 2

Saponification values of samples taken at fixed intervals using different catalysts.

| Catalyst | Saponification value (mg KOH/g sample) Run time (min) | | | |
|---|---|---|---|---|
| | 0 | 20 | 40 | 60 |
| I | 265 | 209.7 | 117.8 | 130.5 |
| II | 265 | 163.0 | 115.0 | 86.7 |
| VI | 265 | 222.8 | 180.8 | 156.0 |
| VII | 265 | 189.4 | 131.5 | 105.5 |

EXAMPLE VII

In order to demonstrate the effect of the iron content on the activity of the catalyst, a number of catalysts have been prepared with different iron contents. The preparation was effected in conformity with the procedure described in Preparation II.

The following Table III shows the effect of the iron content on the hydrogenolysis of methyl acetate (260° C.).

TABLE III

| Test | % Fe (on the basis of wt. % relative to Cu) | Conversion % |
|---|---|---|
| 1 | 0 | 12.6 |
| 2 | 4.8 | 30.4 |
| 3 | 6.2 | 30.9 |
| 4 | 9.1 | 33.8 |
| 5 | 11.1 | 37.6 |
| 6 | 13.0 | 39.6 |
| 7 | 14.9 | 38.8 |
| 8 | 16.7 | 33.8 |

We claim:

1. A method of hydrogenolysing an ester in the presence of a supported catalyst consisting essentially of carrier material, iron and copper, with copper as the active component and iron as the promoter, the proportion of iron, calculated on the amount of copper and iron jointly, on an atomic basis, being no more than 25%.

2. The method of claim 1 wherein said ester is the methyl ester of fatty acid.

3. The method of claim 1 wherein the proportion of iron in said catalyst is no less than 6 at. %.

4. The method of claim 1 wherein the proportion of iron in said catalyst ranges between 10 and 20 at. %.

5. The method of claim 1 wherein the catalyst comprises 15-99% by weight of carrier.

6. The method of claim 1 wherein the catalyst comprises 50-80% by weight of carrier.

7. The method of claim 1 wherein the carrier in said catalyst comprises at least one metal oxide selected from the group consisting of SiO$_2$, Al$_2$O$_3$, TiO$_2$, MgO, ZnO, and Cr$_2$O$_3$.

8. The method of claim 1 wherein the carrier is SiO$_2$ or Al$_2$O$_3$.

* * * * *

UNITED STATES PATENT AND TRADEMARK OFFICE
CERTIFICATE OF CORRECTION

PATENT NO. : 5,198,592
DATED : March 30, 1993
INVENTOR(S) : Johannes van Beijnum, et. al.

It is certified that error appears in the above-indentified patent and that said Letters Patent is hereby corrected as shown below:

Title page, item [57], Abstract, after the last sentence, insert --Iron copper catalysts with up to 25% iron based on total iron and copper are disclosed for hydrogenation-dehydrogenation reactions--.

Column 7, line 34, "and, or" should read --and/or--.

Column 9, line 61,

"$CH_3COOCH_3+CH_3CH_2OH \rightarrow CH_3COOCH_2CH_3+CH_3OH$"

should read

--$CH_3COOCH_3+CH_3CH_2OH \rightarrow CH_3COOCH_2CH_3+CH_3OH$--.

Column 12, lines 56-57, "SiO-" should read --$SiO_2$- --.
Column 12, line 57, delete "2"--.

Signed and Sealed this

Thirtieth Day of August, 1994

*Attest:*

BRUCE LEHMAN

*Attesting Officer*  *Commissioner of Patents and Trademarks*